United States Patent
Dominique et al.

(10) Patent No.: US 7,317,702 B2
(45) Date of Patent: Jan. 8, 2008

(54) METHOD AND APPARATUS FOR ENHANCING PERFORMANCE OF CHANNEL QUALITY INDICATOR (CQI) CHANNEL IN WIRELESS COMMUNICATIONS SYSTEM

(75) Inventors: Francis Dominique, Rockaway, NJ (US); Hongwei Kong, Denville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 417 days.

(21) Appl. No.: 10/903,994

(22) Filed: Jul. 30, 2004

(65) Prior Publication Data

US 2006/0023650 A1    Feb. 2, 2006

(51) Int. Cl.
*H04Q 7/00* (2006.01)
(52) U.S. Cl. .............. 370/328; 370/333; 370/310; 455/69; 455/67.1
(58) Field of Classification Search .......... 370/328, 370/333, 310; 455/69, 67.1
See application file for complete search history.

(56) References Cited

U.S. PATENT DOCUMENTS

| | | | |
|---|---|---|---|
| 2002/0081977 A1* | 6/2002 | McCune, Jr. | 455/67.1 |
| 2003/0054847 A1* | 3/2003 | Kim et al. | 455/517 |
| 2004/0057394 A1 | 3/2004 | Holtzman | 370/317 |
| 2004/0110473 A1* | 6/2004 | Rudolf et al. | 455/69 |

FOREIGN PATENT DOCUMENTS

EP    1 349 292    10/2003
WO    WO 2004/051872    6/2004

OTHER PUBLICATIONS

European Search Report, Appl. No. 05254499.6-1236 PCT/, (Oct. 27, 2005).

* cited by examiner

*Primary Examiner*—Danh Le

(57) ABSTRACT

The channel quality indicator (CQI) transmitted by a mobile terminal to a base station is indicative of the $E_c/N_t$ pilot SNR of the pilot signal transmitted by the base station and measured by the mobile terminal. The base station uses the CQI for purposes such as determining a downlink rate, a modulation scheme, and downlink power. Knowledge by the base station of whether the received and detected CQI is likely to be "good" or "bad" would be useful in determining how and whether the value of the received and detected CQI should be used. In a first embodiment, at the base station, a reliability of the received CQI that is detected from received soft symbol metrics is determined in conjunction with the detected CQI value for the received CQI word as a whole. In a second embodiment, a minimum bit error probability receiver is used that makes a maximum likelihood decision for each CQI bit individually from the plurality of metrics derived from the received soft symbol metrics, and the reliability of each CQI bit is individually determined.

18 Claims, 4 Drawing Sheets

US 7,317,702 B2

METHOD AND APPARATUS FOR ENHANCING PERFORMANCE OF CHANNEL QUALITY INDICATOR (CQI) CHANNEL IN WIRELESS COMMUNICATIONS SYSTEM

TECHNICAL FIELD

This invention relates to wireless communications, and more particularly, to the processing of an uplink Channel Quality Indicator (CQI) received by a base station in a wireless communications system.

BACKGROUND OF THE INVENTION

In wireless communications systems, such as those operating in accordance with 3GPP2 CDMA2000-1x EVDV standards or 3GPP UMTS W-CDMA standards, for high-speed data transmission the base station (or NodeB in UMTS terminology) transmits on the forward channel to the mobile terminal (UE [User Equipment] in UMTS terminology) to which the data is directed, a pilot signal (Common Pilot Channel—CPICH for UMTS), a Forward Packet Data Channel (F-PDCH, or High Speed Downlink Shared Control Channel—HS-SCCH for UMTS), and Forward Packet Data Control Channel (F-PDCCH, or High Speed Downlink Shared Channel—HS-DSCH for UMTS). In order for the base station to determine a proper data rate, a modulation scheme, and a transmit power for the F-PDCH and F-PDCCH, it needs to have some measure of how "good" the channel currently is. Accordingly, the mobile terminal provides a measure of channel quality to the base station via a Channel Quality Indicator Channel (CQICH) that is transmitted on the reverse link. In determining what CQI the mobile terminal should transmit back to the base station, the $E_c/N_t$ signal-to-noise ratio (SNR) of the pilot signal received by the mobile terminal from the base station is used by the mobile terminal as an input to a look-up table (LUT), which quantizes that received pilot SNR into 16 possible levels, each of which is represented at a 4-bit CQI word. That CQI, when transmitted by the mobile terminal and received and detected by the base station, is converted at the base station back into its corresponding $E_c/N_t$ pilot SNR, which is then used by the base station to set the downlink power, the modulation scheme, and the rate for the base station's next downlink transmission. Since the received CQI is a measure of the channel condition during a time period that has just passed, the base station may process the determined $E_c/N_t$ to predict a current channel condition.

A received CQI that has been corrupted by noise on the channel and detected in error can have a deleterious effect on the system performance. For example, if the CQI that has been detected from received soft symbol metrics and converted to its corresponding $E_c/N_t$ pilot SNR is indicative of a channel quality that is better than the actual channel quality, then the base station will allocate a higher rate and lower power than is required, which transmission will then have a high probability of not being accurately received by the mobile terminal. As a result, the base station will likely have to retransmit, thereby affecting system latency. On the other hand, if the detected CQI when converted to its corresponding $E_c/N_t$ pilot SNR is indicative of a channel that is worse than the actual channel quality, then the base station will then transmit at a lower data rate and at a higher power level than is required. This higher-than-necessary power level can cause interference on adjacent cells, and the transmission will take longer than is necessary since its data rate will be lower than what it could be for the actual channel conditions. In both cases, it probably would be better to use a previous CQI value that was known to be a "good" representation of the previous channel condition than a CQI that is a "bad" representation of the current channel condition. The prior art, however, provides no way of determining whether a received CQI is a "good" or a "bad" representation of the current channel condition.

SUMMARY OF THE INVENTION

The inventors have realized that knowledge by the base station of whether the received and detected CQI is likely to be "good" or "bad" would be useful in determining how and whether the value of the received and detected CQI should be used, where the CQI has been transmitted to the base station by the mobile terminal in response to the measured $E_c/N_t$ pilot SNR of the pilot signal transmitted by the base station. In accordance with an embodiment of the present invention, at the base station, a reliability of the received CQI that is detected from received soft symbol metrics is determined in conjunction with the detected CQI value. The base station then uses the determined reliability of the CQI to decide, for example, whether or not to use the detected CQI value in determining a downlink rate, a modulation scheme, and downlink power. In a first embodiment, CQI reliability is determined for the detected CQI word as a whole. A second embodiment takes into account the fact that an error in a more significant bit of the detected CQI word will have a much more deleterious effect than an error in less significant bit. Thus, rather than using a minimum probability of a word error receiver that selects as a transmitted CQI word the word as a whole that produces a largest metric from a plurality of metrics derived from the received soft symbol metrics, a minimum bit error probability receiver is used that makes a maximum likelihood decision for each CQI bit individually from the plurality of metrics derived from the received soft symbol metrics. Concomitant with individually determining each bit, the reliability of each CQI bit is also individually determined. For the second embodiment, a decision of whether or not to use the resultant detected CQI for determining upper level processing can be made in accordance with a combination of the determined reliability for each bit and each bit's associated significance. CQI word reliability in the first embodiment and the reliability of each CQI bit in the second embodiment are calculated from predetermined functions of the plurality of metrics derived from the received CQI soft symbol metrics.

DETAILED DESCRIPTION

As aforenoted, knowledge by the base station of the reliability of a decoded CQI word is advantageous for higher layer processing. As noted, one motivation for generating a reliability function at the base station for the decoded CQI is that the $E_c/N_t$ pilot SNR to which it corresponds is used by the higher layer to allocate a downlink packet data rate, to select a modulation scheme to be used on the downlink (e.g., QPSK, 8-PSK, 16-QAM), and to determine the power at which to transmit on the downlink. By providing the higher layer with knowledge of how reliable the decoded CQI word is, this information then can be used in making a better decision regarding selection of these downlink parameters. A second motivation for generating a reliability function for the decoded CQI word is that the reliability information can be used by the higher layer to monitor the propagation channel condition and to adjust the CQI report repetition rate and report interval accordingly. For example, if the reliability of the decoded and detected CQI words is determined to be good and the CQI variation is slow (which information can be obtained by comparing the rate of change between successive decoded CQI word values), then the higher layer can instruct the mobile terminal to transmit the CQI at a lower rate with no repetition, thereby reducing the drain on the mobile battery and reducing interference on the uplink.

Figure 1:
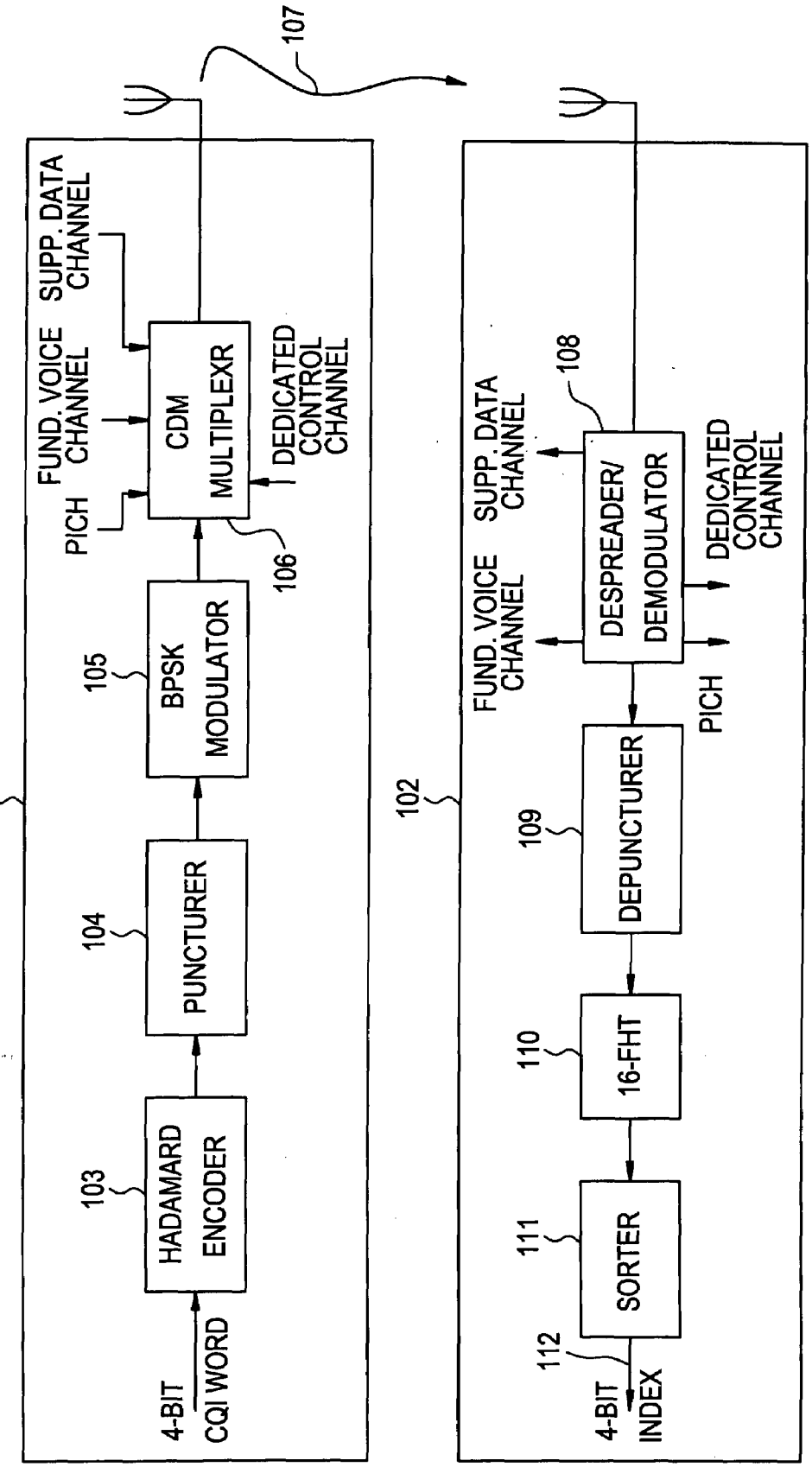
FIG. 1 is a prior art high-level block diagram of the uplink CQI channel transmission between a mobile transmitter and a base station receiver in a 3GPP2 system.

FIG. 1 shows a prior art high-level block diagram of the uplink CQI channel transmission between a mobile transmitter 101 and a base station receiver 102 in an exemplary 3GPP2 system. For 3GPP2, a CQI word has four bits. That 4-bit CQI word is derived by mobile transmitter 101 from a measured $E_c/N_t$ of the received SNR of the pilot that was transmitted downlink by the base station. A look-up table (LUT) (not shown) at the mobile transmitter quantizes the measured received $E_c/N_t$ into one of sixteen possible levels, which is represented by the 4-bit CQI word. At mobile transmitter 101, a 16-point Hadamard encoder 103 encodes that 4-bit CQI word. The encoding is a mapping where the 4-bit CQI word in decimal format is used as row index to select a row vector from a 16×16 Hadamard matrix. The encoded 16-bit word is then punctured by puncturer 104, which removes the first four bits. BPSK modulator 105 then modulates the resultant 12-bit word. Multiplexer 106 code-division multiplexes (CDM-es) that 12-bit word with the pilot channel (PICH), the fundamental voice channel (if it is on), the supplemental data channel (if it is on), and the dedicated control channel used for carrying signaling information (if it is on). The CDM-ed signal is transmitted over the propagation channel 107 to the base station receiver 102.

At the base station receiver 102, a despreader/demodulator 108 despreads and demodulates the received CDM-ed signal to recover the PICH, the fundamental voice channel, the supplemental data channel, the dedicated control channel, and the twelve soft-symbol metrics associated with the 12-bit punctured and transmitted Hadamard-encoded CQI word. Depuncturer 109 replaces the soft symbol metrics corresponding to the punctured 4-bits by pre-pending four "0's" to the received 12 soft-symbol metrics associated with the 12-bit punctured and transmitted Hadamard code word. A 16-bit inverse Hadamard transform is then performed by 16-FHT (16-point inverse fast Hadamard transformer) 110, which produces at its output metrics for indices 0-15, corresponding to each possible Hadamard-encoded CQI word. Sorter 111 then selects as the transmitted CQI word, the metric having the largest magnitude (sign-included) and outputs on output 112 as the transmitted CQI word, the 4-bit index corresponding to that selected metric having the largest magnitude. That index is converted by the base station receiver (not shown) to an associated $E_c/N_t$ pilot SNR and is used by the upper layer, as previously described, to set the downlink power, the modulation scheme, and the rate for downlink transmission.

Figure 2:
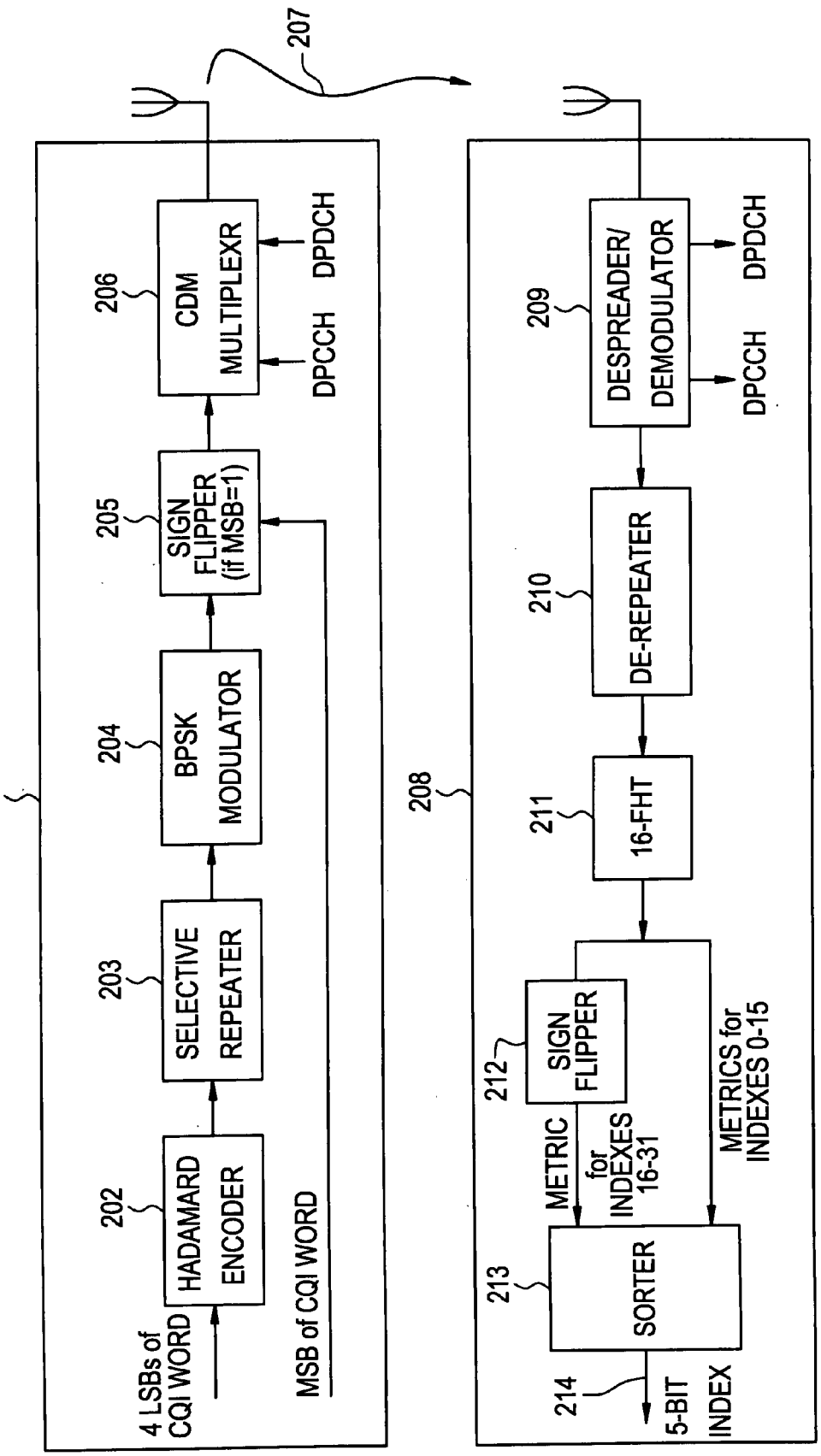
FIG. 2 is a prior art high-level block diagram of the uplink CQI channel transmission between a mobile transmitter (UE) and a base station receiver (NodeB) in a 3GPP system.

In a prior art 3GPP mobile communications system, shown in FIG. 2, a CQI word has five bits. At the UE transmitter 201, a 16-bit Hadamard encoder 202 encodes the four least significant bits (LSBs) of the CQI word. The encoding is the same as the one in the above-described 3GPP2 system. One bit of the encoded 16-bit word is repeated four more times by selective repeater 203, yielding a 20-bit word. BPSK modulator 204 then modulates the resultant 20-bit word. The most significant bit (MSB) of the 5-bit uncoded CQI word is then used to control the signs of all twenty modulated symbols. If MSB=0, there is no sign change; otherwise, sign flipper 205 changes the sign of all twenty BPSK symbols. The resultant signal is then code division multiplexed by multiplexer 206 with the Dedicated Physical Control Channel (DPCCH, which includes the pilot signals) the Dedicated Physical Data Channel(s) (DPDCH, which time-multiplex voice and data transport channels in one code channel)before being transmitted over the propagation channel 207. At the NodeB receiver 208, despreader/demodulator 209 despreads and demodulates the received CDM signal to produce the voice and data transport channels, the DPCCH, and the soft symbol metrics associated with the transmitted 20-bit Hadamard encoded CQI. A de-repeater 210 accumulates the soft symbol metrics of the five symbols that represents the same transmitted coded bit to undo the repetition of that bit at UE transmitter 201. A 16-FHT 211 performs a 16-point inverse fast Hadamard transform to determine the metric associated with each of the 16 indexes with no sign flip. The output metrics represent the indexes from 0-15. Sign flipper 212 flips the sign of each of the 16 outputs to produce the metrics that correspond to code words of indexes with MSB=1 for indexes 16-31. Sorter 213 determines the maximum metric out of the 32 metrics and produces on output 214 the index associated with that maximum metric as the 5-bit decoded CQI word. As in 3GPP2, that CQI word is converted to an $E_c/N_t$ pilot SNR and is used by the higher level to determine downlink parameters In accordance with an embodiment of the present invention, at the receiving base station, in addition to detecting the transmitted CQI word, the reliability of that detected CQI word is determined. As noted above, the higher layer at the base station (NodeB) can then use this determined reliability to make a better decision in selecting an appropriate downlink packet data rate, a modulation scheme, and power allocation. Further, as noted above, the higher layer can use this information to monitor the propagation channel condition and adjust the CQI report repetition rate and report interval.

As an illustrative example, the 3GPP2 CQI channel is used to show how the reliability information is generated. In FIG. 1, the input metrics to selector 111 from the output of 16-FHT 110 are designated as $w_0, w_1, \ldots, w_{15}$, for indexes 0, 1, ..., 15. It can be assumed that index 'j' has the largest metric $w_j$, where j can take any value between 0 and 15, inclusive. Selector 111 thus produces 'j' as its output (in binary format), i.e., 'j' is decided as the CQI word that was transmitted and is the detected and decoded CQI word to be passed on to the higher layer for further processing. The reliability information for this decision is the probability that this code word has been decoded correctly. This probability, P, can be calculated from the following equation:

$$P = \frac{e^{w_j}}{\sum_{k=0}^{15} e^{w_k}} \quad (1)$$

Figure 3:
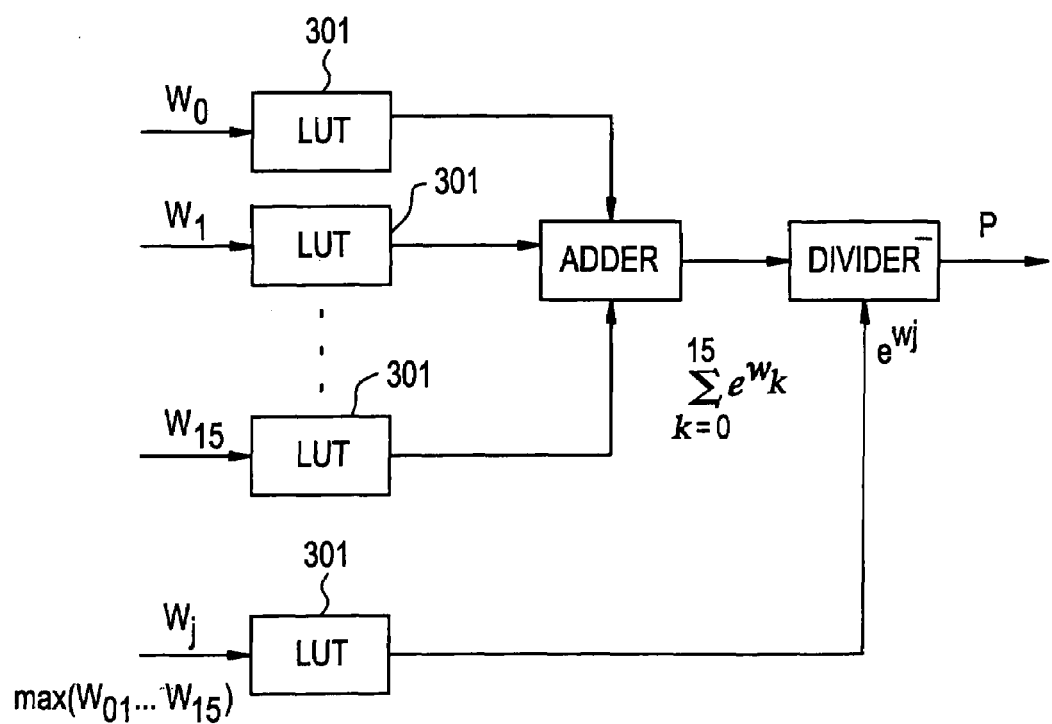
FIG. 3 shows an implementation for generating the decoded CQI reliability information in a 3GPP2 system.

For an actual hardware or DSP implementation, an 8-bit representation of $w_j$ is sufficient. For this case, the exponential function $e^{w_k}$ can be implemented as a 256-entry look-up table. FIG. 3 shows an exemplary implementation that can be used by the base station receiver to calculate P. The 16 outputs, $w_0$-$w_{15}$, of 16-FHT 110 (in FIG. 1) are each inputted to a look-up table (LUT) 301 to determine for each input k, $e^{w_k}$. Although LUT 301 is shown in the figure as consisting of separate lookup tables that are used to individually calculate each exponential function for each $w_k$, in an actual implementation a single lookup table can be used to calculate each $e^{w_k}$. The $w_0$-$w_{15}$ 16 outputs of LUT 301 are then summed by adder 302 to determine the denominator of equation (1). The output $w_j$ of 16-FHT 110 (in FIG. 1) selected by sorter 111 (in FIG. 1) as being the largest metric, is then inputted to LUT 301 to determine $e^{w_j}$, the numerator of equation (1). Divider 303 then calculates P as per equation (1).

For a 3GPP system as shown in FIG. 2, the reliability information for a detected CQI word is calculated in a similar manner as shown in FIG. 3, except that adder 302 has 32 inputs.

The above-described embodiment is a minimum probability word error receiver, i.e., the CQI word that results is the index associated with the largest metric at the output of the inverse Hadamard transform applied to the soft symbol metrics of the received Hadamard-coded CQI word. From the network point of view, however, picking the word with the largest metric may not be optimum. Using 3GPP2 as an example, Table 1 shows the mapping between the channel quality measurement at the mobile terminal on the downlink common pilot channel, which is the downlink $E_c/N_t$ pilot SNR, and the 4-bit CQI word to be transmitted in the uplink CQI channel.

TABLE 1

| Channel Quality (downlink pilot $E_c/N_t$ in dB) | 4-bit CQI word |
|---|---|
| −16.25 | 0000 |
| −14.75 | 0001 |
| −13.25 | 0010 |
| −11.75 | 0011 |
| −10.25 | 0100 |
| −8.75 | 0101 |
| −7.25 | 0110 |
| −5.75 | 0111 |
| −4.25 | 1000 |
| −2.75 | 1001 |
| −1.25 | 1010 |
| 0.25 | 1011 |
| 1.75 | 1100 |
| 3.25 | 1101 |
| 4.75 | 1110 |
| 6.25 | 1111 |

It can be seen that than an error on the MSB will have a larger impact on the CQI value than an error on the LSB. For example, if the mobile terminal transmits a CQI of '0000' that is detected by the base station receiver as '0001', then the error between the actual $E_c/N_t$ measured by the mobile terminal and the $E_c/N_t$ represented by the detected CQI at the base station is only 1.5 dB. If, however, the mobile terminal transmits a CQI of '0000' that is detected by the base station as '1000', then the error is 12 dB. This magnitude of error can have a very significant impact on the MAC layer scheduler performance at the base station in allocating downlink packet rate, power and modulation. A minimum bit error probability receiver that individually selects each bit in the decoded CQI word is thus preferable to the prior art minimum probability word error receiver used in the afore-described 3GPP and 3GPP2 systems. Such a minimum bit error probability receiver individually selects each bit based on the likelihood ratio determined for each bit.

By denoting the CQI word to be decoded as $b_3 b_2 b_1 b_0$ from MSB to LSB, the likelihood ratio for bit $b_i$, $LR_i$, can be calculated as follows:

$$LR_i = \frac{\sum_{\text{all } k \text{ where } b_i=0} e^{w_k}}{\sum_{\text{all } k \text{ where } b_i=1} e^{w_k}} \quad (2)$$

and the decision as to what $b_i$ was transmitted is given by:

if $LR_i > 1.0$, $b_i = 0$; otherwise $b_i = 1$. (3)

Figure 4:
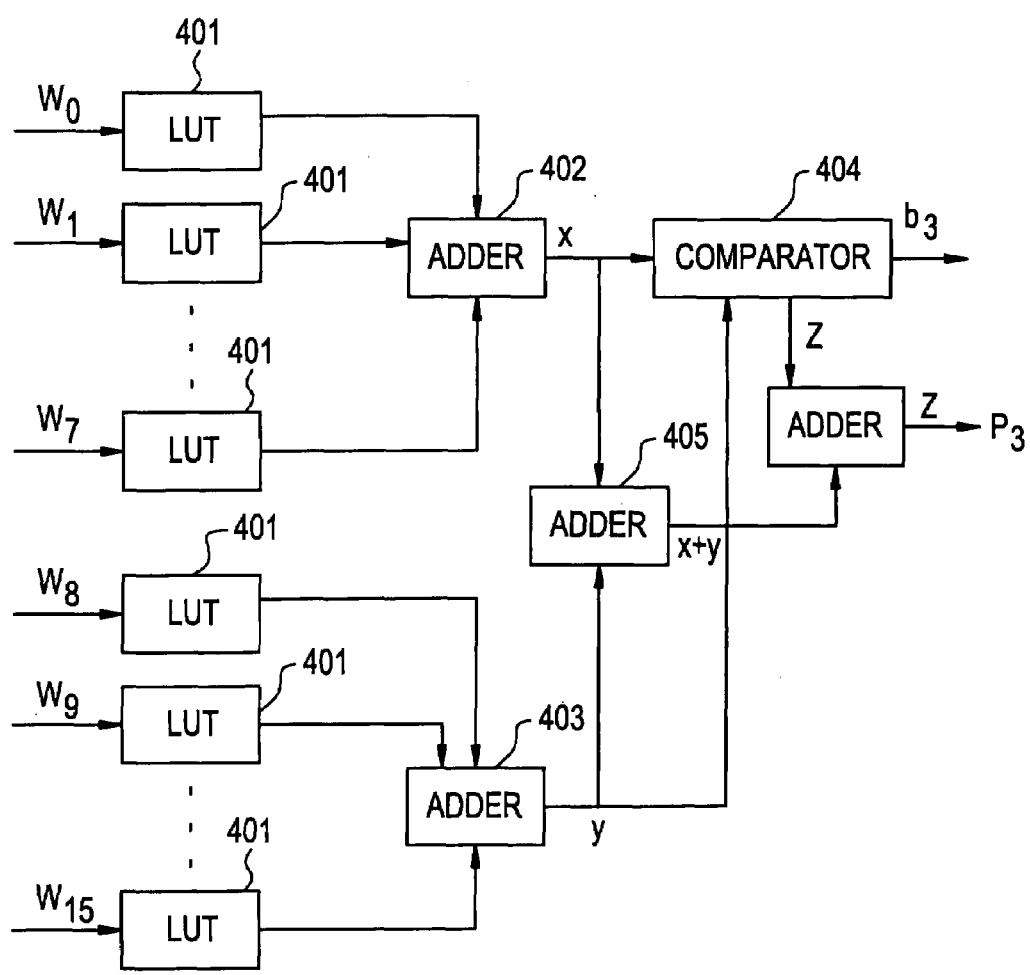
FIG. 4 shows an implementation determining each CQI bit with minimum bit error probability with the associated bit reliability of each bit in a 3GPP2 system.

The calculation of $LR_i$ can be performed using a 256-entry LUT in a manner similar to that performed in FIG. 3 in determining the reliability P for the minimum probability of word error receiver. FIG. 4 shows the calculation of $LR_3$ as an example for 3GPP2. For $b_3$, the indexes for which $b_3$, the MSB of CQI, is '1' correspond to $w_8$-$w_{15}$, inclusively, while the indexes for which $b_3$ is '0' correspond to $w_0$-$w_7$, inclusively. Thus, in FIG. 4, the $w_0$-$w_7$ outputs of 16-FHT 110 (in FIG. 1) are inputted to LUT 401 to determine $e^{w_k}$ for each such $w_k$, k=0-7. The $w_0$-$w_7$ outputs of each LUT 401 are then summed by adder 402 to determine x, the numerator of equation (2) for $LR_3$. Similarly the $w_8$-$w_{15}$ outputs of 16-FHT 110 (in FIG. 1) are inputted to LUT 401 to determine $e^{w_k}$ for each such $w_k$, k=8-15. These $w_8$-$w_{15}$ outputs are then summed by adder 403 to determine y, the denominator of equation (2) for $LR_3$. Comparator 404 then compares x with y and outputs a '0' as $b_3$ if x>y, or a '1' as $b_3$ otherwise.

The reliability information for that decoded bit $b_3$ is equal to the probability of a decoding error for that bit, $P_3$, and is given by equation (4):

$$P_3 = \frac{\max\left\{\sum_{\text{all } k \text{ where } b_3=1} e^{w_k}, \sum_{\text{all } k \text{ where } b_3=0} e^{w_k}\right\}}{\sum_{\text{all } k \text{ where } b_3=1} e^{w_k} + \sum_{\text{all } k \text{ where } b_3=0} e^{w_k}} \quad (4)$$

In FIG. 4, adder 405 forms the denominator by summing x and y. Comparator 404 outputs the numerator z. If x>y, then z=x. Otherwise, z=y. Divider 406 divides the numerator z, by the denominator x+y, to produce the output $P_3$.

The other bits, $b_2$, $b_1$ and $b_0$, are similarly determined, using the methodology of FIG. 4, with a different set of $w_k$'s being used to determine x and y as is appropriate for the bit $b_i$ being determined. For 3GPP, with a 5-bit CQI word, there would be a total of 32 $w_k$ inputs to the LUT, appropriately divided to determine for each bit $LR_i$ and $P_i$ according to the particular bit.

The upper layer can then use the reliability associated with each individually determined bit value in allocating downlink packet data rate, power and modulation. Thus, if the reliability of the MSB of the CQI is low, upper layer may decide not to use the decoded CQI in determining those parameters and continue to use the parameters previously determined from a more reliable CQI. On the other hand, if the reliability of only the LSB of the CQI is low, then it may be decided to use the detected CQI since, as noted from Table 1, the likelihood is that there will be at most only a 1.5 dB error in choosing the downlink $E_c/N_t$ pilot SNR.

While the particular invention has been described with reference to the illustrative embodiments, this description should not be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Although described in conjunction with 3GPP2 CDMA2000-1x EVDV and 3GPP UMTS W-CDMA standards, the present invention could be implemented in any CDMA or non-CDMA, wireless or wired electrical or optical communication system that requires a channel quality measurement reported back from a receiving terminal to a transmitting terminal, including, by way of example, an FDM system, or a broadband wireless access system in accord with IEEE 802.11 or other standards such as EVDO. Further, the invention may be implemented in different locations, such as a base station (NodeB in UMTS terminology), a base station controller (a Radio Network Controller [RNC] in UMTS terminology) and/or a mobile switching center (a mobile service switching center [MSC] in UMTS terminology). In wireless systems having a high-speed uplink, it could also be employed in the mobile terminal (UE in UMTS terminology). or elsewhere depending upon in what type of system the invention is employed. Further, although in the described embodiments the CQI bit word is coded by a Hadamard coder at the transmitting mobile terminal and the soft symbol metrics of the Hadamard code that are received at the base station are decoded through an inverse Hadamard transform, other coding/decoding schemes can be used such as convolutional coding, BCH block coding, or no coding at all. The processing circuitry required to implement and use the described invention may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

The invention claimed is:

1. A method comprising the steps of:
receiving soft symbol metrics associated with a transmitted channel quality indicator;
detecting the transmitted channel quality indicator from the received soft symbol metrics; and
determining a reliability associated with the detected transmitted quality indicator, wherein the transmitted channel quality indicator is a multi-bit word and the received soft symbol metrics associated with the transmitted channel quality indicator are converted to a plurality of metrics, each of the metrics are associated with a different channel quality word, and the reliability associated with the detected transmitted channel quality indicator is determined based on each of the metrics.

2. The method of claim 1 wherein the reliability is determined for the channel quality indicator word as a whole.

3. The method of claim 2 wherein the transmitted channel quality indicator is an n-bit word and the received soft symbol metrics associated with the transmitted channel quality indicator are converted to $2^n$ metrics $w_0, w_2, \ldots, w_{2^n-1}$, that are each associated with a different channel quality word, wherein the detected word is the channel quality word associated with the largest metric, $w_j$, and wherein the reliability of the detected channel quality word is determined by $$\frac{e^{w_j}}{\sum_{k=0}^{2^n-1} e^{w_k}}.$$

4. The method of claim 3 wherein the received soft symbol metrics are the received metrics of a Hadamard encoding of the channel quality indicator.

5. The method of claim 1 wherein each bit of the channel quality indicator word is individually detected from the received soft symbol metrics, and wherein the reliability of the detected channel quality indicator word is determined for each bit individually.

6. The method of claim 5 wherein the transmitted channel quality indicator is an n-bit word and the received soft symbol metrics associated with the transmitted channel quality indicator are converted to $2^n$ metrics $w_0, w_2, \ldots, w_{2^n-1}$, that are each associated with a different channel quality word, wherein each bit $b_i$ (i=0 to n-1) of the channel quality indicator word is determined according to whether the likelihood ratio $LR_i$ equal to $$\frac{\sum_{\text{all } k \text{ where } b_i=0} e^{w_k}}{\sum_{\text{all } k \text{ where } b_i=1} e^{w_k}},$$

is greater or less than one, and wherein the reliability of bit $b_i$ is determined by $$\frac{\max\left\{\sum_{\text{all } k \text{ where } b_k=1} e^{w_k}, \sum_{\text{all } k \text{ where } b_k=0} e^{w_k}\right\}}{\sum_{\text{all } k \text{ where } b_k=1} e^{w_k} + \sum_{\text{all } k \text{ where } b_k=0} e^{w_k}}.$$

7. The method of claim 6 wherein the received soft symbol metrics are the received metrics of a Hadamard encoding of the channel quality indicator.

8. The method of claim 1 wherein the method is performed at a base station in a wireless communications system.

9. The method of claim 8 wherein the channel quality indicator is transmitted by a mobile station and is representative of a pilot signal-to-noise ratio $E_b/N_t$ of a pilot signal received by the mobile station from the base station.

10. Apparatus comprising:
   receiving means for receiving soft symbol metrics associated with a transmitted channel quality indicator;
   detecting means for detecting the transmitted channel quality indicator from the received soft symbol metrics; and
   reliability determining means for determining a reliability associated with the detected transmitted quality indicator, wherein the transmitted channel quality indicator is a multi-bit word and the received soft symbol metrics associated with the transmitted channel quality indicator are converted to a plurality of metrics, each of the metrics are associated with a different channel quality word, and the reliability associated with the detected transmitted channel quality indicator is determined based on each of the metrics.

11. The apparatus of claim 10 wherein the reliability determining means determines the reliability of the channel quality indicator word as a whole.

12. The apparatus of claim 11 wherein the transmitted channel quality indicator is an n-bit word and the received soft symbol metrics associated with the transmitted channel quality indicator are converted to $2^n$ metrics $w_0, w_2, \ldots, w_{2^n-1}$, that are each associated with a different channel quality word, wherein the detected word is the channel quality word associated with the largest metric, $w_j$, and wherein the reliability determining means determines the reliability of the detected channel quality word by $$\frac{e^{w_j}}{\sum_{k=0}^{2^n-1} e^{w_k}}.$$

13. The apparatus of claim 12 wherein the received soft symbol metrics are the received metrics of a Hadamard encoding of the channel quality indicator.

14. The apparatus claim 10 wherein the detecting means detects each bit of the channel quality indicator word individually from the received soft symbol metrics, and wherein the reliability determining means determines the reliability of the detected channel quality indicator for each bit individually.

15. The apparatus of claim 14 wherein the transmitted channel quality indicator is an n-bit word and the received soft symbol metrics associated with the transmitted channel quality indicator are converted to $2^n$ metrics $w_0, w_2, \ldots, w_{2^n-1}$, that are each associated with a different channel quality word, wherein the detecting means determines each bit $b_i$ (i=0 to n-1) of the channel quality indicator word according to whether the likelihood ratio $LR_i$ equal to $$\frac{\sum_{\text{all } k \text{ where } b_i=0} e^{w_k}}{\sum_{\text{all } k \text{ where } b_i=1} e^{w_k}},$$

is greater or less than one, and wherein the reliability determining means determines the reliability of bit $b_i$ is by $$\frac{\max\left\{\sum_{\text{all } k \text{ where } b_k=1} e^{w_k}, \sum_{\text{all } k \text{ where } b_k=0} e^{w_k}\right\}}{\sum_{\text{all } k \text{ where } b_k=1} e^{w_k} + \sum_{\text{all } k \text{ where } b_k=0} e^{w_k}}.$$

16. The apparatus of claim 15 wherein the received soft symbol metrics are the received metrics of a Hadamard encoding of the channel quality indicator.

17. The apparatus of claim 10 wherein the apparatus is located in a base station in a wireless communications system.

18. The apparatus of claim 17 wherein the channel quality indicator is transmitted by a mobile station and is representative of a pilot signal-to-noise ratio $E_b/N_1$ of a pilot signal received by the mobile station from the base station.

* * * * *